United States Patent
Isoi et al.

(10) Patent No.: US 11,493,449 B2
(45) Date of Patent: Nov. 8, 2022

(54) SULFUR CHEMILUMINESCENCE DETECTOR ANALYSIS SYSTEM, DISPLAY CONTROL METHOD AND NON-TRANSITORY COMPUTER READABLE MEDIUM

(71) Applicant: Shimadzu Corporation, Kyoto (JP)

(72) Inventors: Takuya Isoi, Kyoto (JP); Yasuhiro Kimoto, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 163 days.

(21) Appl. No.: 16/539,102

(22) Filed: Aug. 13, 2019

(65) Prior Publication Data
US 2020/0072754 A1 Mar. 5, 2020

(30) Foreign Application Priority Data
Sep. 4, 2018 (JP) .............................. JP2018-165014

(51) Int. Cl.
G01N 21/76 (2006.01)
G01N 30/74 (2006.01)
G01N 30/02 (2006.01)

(52) U.S. Cl.
CPC .......... *G01N 21/766* (2013.01); *G01N 30/74* (2013.01); *G01N 2030/025* (2013.01)

(58) Field of Classification Search
CPC ............................ G01N 21/766; G01N 30/74
(Continued)

(56) References Cited

U.S. PATENT DOCUMENTS 4,818,883 A * 4/1989 Anderson .............. G01N 21/76
250/361 C
5,194,949 A * 3/1993 Poulsen ............. G01N 21/5911
377/10
(Continued)

FOREIGN PATENT DOCUMENTS

CA 2094939 * 10/1994
JP 2007101351 A 4/2007
(Continued)

OTHER PUBLICATIONS

Agilent 355 Sulfur and 255 Nitrogen Chemiluminescence Detectors Operation and Maintenance Manual 2012, 120 pages, downloaded from https://www.agilent.com/cs/library/usermanuals/public/G6600-90006.pdf.*

(Continued)

*Primary Examiner* — Arlen Soderquist
(74) *Attorney, Agent, or Firm* — Maier & Maier, PLLC

(57) ABSTRACT

When an operation receiver receives an operation for starting automatic start-up processing, a display controller causes a display to display a first direction image indicating a working order of a plurality of objects to be controlled, sequentially changes a display mode of a status image corresponding to an object that has worked to a first mode, and changes a display state of each of a plurality of operation images to an operable first state or an inoperable second state. When the operation receiver receives an operation for starting automatic stop processing, the display controller causes the display to display a second direction image indicating a stopping order of the plurality of objects in a reversed manner of the first direction image, sequentially changes a display mode of a status image corresponding to an object that has stopped to a second mode.

16 Claims, 11 Drawing Sheets

(58) Field of Classification Search
USPC ........... 422/52, 70, 88–89, 91; 436/120, 172
See application file for complete search history.

(56) References Cited

U.S. PATENT DOCUMENTS

| | | | | |
|---|---|---|---|---|
| 5,384,024 | A * | 1/1995 | Moring | G01N 27/44782 |
| | | | | 204/602 |
| 5,787,015 | A * | 7/1998 | Aldridge | G05B 19/4184 |
| | | | | 702/23 |
| 5,872,627 | A * | 2/1999 | Miers | G01N 15/1431 |
| | | | | 356/338 |
| 6,068,978 | A * | 5/2000 | Zaun | B01L 3/502 |
| | | | | 422/141 |
| 6,148,657 | A * | 11/2000 | Satoh | G01N 30/88 |
| | | | | 422/84 |
| 6,329,139 | B1 * | 12/2001 | Nova | B01J 19/0046 |
| | | | | 209/597 |
| 6,369,893 | B1 * | 4/2002 | Christel | B01J 19/0093 |
| | | | | 250/458.1 |
| 6,415,235 | B1 * | 7/2002 | Bartholomew | G01N 21/553 |
| | | | | 356/445 |
| 6,656,428 | B1 * | 12/2003 | Clark | B01L 3/502 |
| | | | | 422/404 |
| 7,700,928 | B2 * | 4/2010 | Rasnow | G01N 21/6454 |
| | | | | 250/458.1 |
| 2001/0038450 | A1 * | 11/2001 | McCaffrey | G01N 21/763 |
| | | | | 356/311 |
| 2004/0082872 | A1 * | 4/2004 | von Bahr | A61B 5/0803 |
| | | | | 600/532 |
| 2007/0038389 | A1 * | 2/2007 | Toshima | G01N 30/8651 |
| | | | | 702/32 |
| 2007/0077643 | A1 | 4/2007 | Nakamura et al. | |
| 2008/0179539 | A1 * | 7/2008 | Rasnow | G01N 21/6454 |
| | | | | 250/458.1 |
| 2008/0268494 | A1 * | 10/2008 | Linssen | G01N 15/1459 |
| | | | | 435/39 |
| 2010/0227316 | A1 * | 9/2010 | Suzuki | G01N 21/6458 |
| | | | | 435/6.12 |
| 2019/0162740 | A1 * | 5/2019 | Nose | B01L 3/502761 |
| 2019/0283019 | A1 * | 9/2019 | Li | G05D 16/2026 |

FOREIGN PATENT DOCUMENTS

| | | |
|---|---|---|
| JP | 2010-256375 A | 11/2010 |
| JP | 2015-059876 A | 3/2015 |

OTHER PUBLICATIONS

Dierick, M. et al, Journal of X-Ray Science and Technology 2010, 18, 451-461.*

Scafuri, C, Proceedings of ICALEPCS2011 2011, 263-266.*

Office Action dated Jan. 18, 2022, in connection with corresponding Japanese Application No. 2018165014 (9 pp., including machine-generated English translation).

Agilent Technologies., "Agilent 8355 chemiluminescent sulfur detectors / Agilent 8255 chemiluminescent nitrogendetector user manual"; December; Third Edition; 32 pages with English Translation.

Office Action dated May 9, 2022 in Chinese Patent Application No. 201910832960.7 (with English machine translation); 13 pgs.

Agilent 8355 Sulfur and 8255 Nitrogen Chemiluminescence Detectors; Agilent Technologies, Inc.; Printed in USA, Dec. 2015; 118 pgs.

Office Action dated Sep. 20, 2022 in corresponding Japanese Patent Application No. 2018-165014; 7 pages including English-language translation.

* cited by examiner

SULFUR CHEMILUMINESCENCE DETECTOR ANALYSIS SYSTEM, DISPLAY CONTROL METHOD AND NON-TRANSITORY COMPUTER READABLE MEDIUM

FIELD

The present invention relates to an analysis system including a sulfur chemiluminescence detector, a display control method and a non-transitory computer readable medium storing a display control program.

BACKGROUND

A sulfur chemiluminescence detector (hereinafter referred to as an SCD), which is a component analysis device for quantitative detection of the content of sulfur in a sample mixture, has been known. For example, JP 2015-59876 A describes a gas chromatograph using the SCD.

On the other hand, JP 2010-256375 A describes a chromatograph data processing device that displays operations and setting items required for measurement of chromatographic data in a flow chart based on the flow of a series of operations.

SUMMARY

An analysis device such as the gas chromatograph using the SCD may have an automatic start-up function and an automatic stop function. Using the automatic start-up function and the automatic stop function, the analysis device automatically performs operations of supplying various gases and stopping the supply of the various gases, turning on and off a vacuum pump, turning on and off a detector, etc. according to a predetermined procedure.

However, the analysis device may be started up and stopped manually for maintenance, troubleshooting or the like. Alternatively, the analysis device may be temporarily stopped during automatic start-up or automatic stop, another operation may be performed and then the analysis device may be started up again, etc. In such a case, if each part of the analysis device is not operated according to the correct procedure and in a timely manner, performance deterioration or a malfunction may occur. Therefore, it is difficult to manually operate each component during start-up or stop of the analysis device unless an operator has an advanced knowledge of the operations of the analysis device.

The chromatograph data processing device described in the above-mentioned JP 2010-256375 A displays operations and setting items required for measurement in a flow chart based on the flow of a series of operations, so that the operator can easily understand the operation procedure. However, operations different from the operations performed for the normal start-up or the normal stop may be performed for maintenance or troubleshooting. Using the analysis system including the SCD, when not knowing the specification of the operations of the SCD, the operator cannot determine whether the procedure different from the normal operation procedure can be performed or the operation can be performed at a different time. Thus, when a user operates each component according to the incorrect procedure or in an untimely manner, a problem such as performance deterioration or a malfunction may occur in the SCD.

An object of the present invention is to provide an analysis system, a display control method, and a non-transitory computer readable medium storing a display control program that enable each object to be controlled of a sulfur chemiluminescence detector to be operated according to a correct procedure and in a timely manner such that a problem does not occur.

(1) An analysis system according to one aspect of the present invention includes a sulfur chemiluminescence detector that includes a plurality of objects to be controlled, a display, and a display control device that controls the display, wherein the display control device includes a display controller that causes the display to display a plurality of status images corresponding to the plurality of objects in a row in a working order, and causes the display to display a plurality of operable operation images corresponding to the plurality of objects, and an operation receiver that receives an operation for starting automatic start-up processing and an operation for automatic stop processing, and the display controller, when the operation receiver receives the operation for starting the automatic start-up processing, causes the display to display a first direction image indicating the working order of the plurality of objects, sequentially changes a display mode of a status image corresponding to an object that has worked to a first mode and changes a display state of each of the plurality of operation images to an operable first state or an inoperable second state based on an instruction from the sulfur chemiluminescence detector, and when the operation receiver receives the operation for starting the automatic stop processing, causes the display to display a second direction image indicating a stopping order of the plurality of objects in a reversed manner of the first direction image, and sequentially changes a display mode of a status image corresponding to an object that has stopped to a second mode and changes a display state of each of the plurality of operation images to the first or second state based on an instruction from the sulfur chemiluminescence detector.

In the analysis system, the plurality of status images corresponding to the plurality of objects to be controlled are displayed in the display. Further, the plurality of operation images corresponding to the plurality of objects to be controlled are operably displayed in the display.

In this case, in the automatic start-up processing, the user can easily and visually identify the working order of the plurality of objects to be controlled due to the arrangement of the plurality of status images and the first direction image. Similarly, in the automatic stop processing, the user can easily and visually identify the stopping order of the plurality of objects to be controlled due to the arrangement of the plurality of status images and the second direction image. Further, the user can easily identify whether each object to be controlled has worked or has stopped based on whether each status image is displayed in the first or second mode. Further, the user can easily and visually identify whether the operation image is operable based on whether each operation image is in the first or second state.

Therefore, the user can operate each object to be controlled of the sulfur chemiluminescence detector according to the correct procedure and in a timely manner such that a problem does not occur.

(2) The operation receiver may be configured to receive an operation for interrupting the automatic start-up processing and an operation performed on each operation image, and may be configured to receive an operation performed on an operation image in the first state of the plurality of operation images, and the display controller, when the operation for interrupting the automatic start-up processing is received, may keep display modes of the plurality of status images and display states of the plurality of operation images, and then change a display state of an operated operation image of the operation images in the first state and change a display mode of a related status image based on an instruction from the sulfur chemiluminescence detector.

In this case, the user can interrupt the automatic start-up processing. Further, the user can operate the corresponding object to be controlled through the operation image by operating the operation image in the first state during interruption. Further, the display state of the operated operation image and the display mode of the related status image change. Thus, the operator that does not have an advanced knowledge of the operations of the sulfur chemiluminescence detector can easily carry out maintenance or troubleshooting of each object to be controlled without causing a problem.

(3) The operation receiver may be configured to receive an operation for interrupting the automatic stop processing and an operation performed on each operation image, and may be configured to receive an operation performed on an operation image in the first state of the plurality of operation images, and the display controller, when the operation for interrupting the automatic stop processing is received, may keep display modes of the plurality of status images and display states of the plurality of operation images, and then may change a display state of an operated operation image of operation images in the first state and may change a display mode of a related status image based on an instruction from the sulfur chemiluminescence detector.

In this case, the user can interrupt the automatic stop processing. Further, the user can operate the corresponding object to be controlled through the operation image by operating the operation image in the first state during interruption. Further, the display state of the operated operation image and the display mode of the related status image change. Thus, the operator that does not have an advanced knowledge of the operations of the sulfur chemiluminescence detector can easily carry out maintenance or troubleshooting of each object to be controlled without causing a problem.

(4) The display controller may transmit an operation signal indicating that an operation has been performed an operation image to the sulfur chemiluminescence detector when the operation image in the first state is operated, and does not have to transmit the operation signal to the sulfur chemiluminescence detector when an operation image in the second state is operated.

In this case, when the user operates the operation image in the inoperable second state, the corresponding object to be controlled of the sulfur chemiluminescence detector is prevented from being started up or stopped.

(5) The display controller may erase the first direction image after the automatic start-up processing is completed, and may erase the second direction image after the automatic stop processing is completed.

In this case, the user can easily and visually identify the completion of the automatic start-up processing or the automatic stop processing.

(6) The sulfur chemiluminescence detector may include a detection controller that transmits an instruction for displaying each of the plurality of status images in the first or second mode based on a state of a corresponding object, and may transmit an instruction for changing a display state of each of the plurality of operation images to the first or second state based on states of the plurality of objects and a predetermined operation condition to the display controller.

In this case, the display modes of the corresponding status images are switched based on the states of the plurality of objects to be controlled. The display states of each operation image are switched based on the states of the plurality of objects to be controlled and the predetermined operation condition.

(7) A display control method according to another aspect of the present invention of controlling a display for an operation of a sulfur chemiluminescence detector including a plurality of objects to be controlled, includes causing the display to display a plurality of status images corresponding to the plurality of objects in a row in a working order, and causing the display to display a plurality of operable operation images corresponding to the plurality of objects, receiving an operation for starting automatic start-up processing, an operation for automatic stop processing or an operation performed on each operation image, causing the display to display a first direction image indicating the working order of the plurality of objects when the operation for starting the automatic start-up processing is received, sequentially changing a display state of a status image corresponding to an object that has worked to a first mode and changing a display state of each of the plurality of operation images to an operable first state or an inoperable second state based on an instruction from the sulfur chemiluminescence detector, and causing the display to display a second direction image indicating a stopping order of the plurality of objects in a reversed manner of the first direction image when the operation for starting the automatic stop processing is received, and sequentially changing a display mode of a status image corresponding to an object that has stopped to a second mode and changing a display state of each of the plurality of operation images to the first or second state based on an instruction from the sulfur chemiluminescence detector.

The display control method enables the user to operate each object to be controlled of the analysis device according to the correct procedure and in a timely manner such that a problem does not occur.

(8) A non-transitory computer readable medium storing a display control program according to yet another aspect of the present invention that controls a display to operate a sulfur chemiluminescence detector including a plurality of objects to be controlled, wherein the display control program allows the computer to execute a process of causing the display to display a plurality of status images corresponding to the plurality of objects in a row in a working order in the display, and causing the display to display a plurality of operable operation images corresponding to the plurality of objects, a process of receiving an operation for starting automatic start-up processing or an operation for automatic stop processing, a process of causing the display to display a first direction image indicating the working order of the plurality of objects when an operation for starting automatic start-up processing is received, and sequentially changing a display mode of a status image corresponding to an object that has worked to a first mode and changing a display state of each of the plurality of operation images to an operable first state or an inoperable second state based on an instruction from the sulfur chemiluminescence detector, and a process of causing the display to display a second direction image indicating a stopping order of the plurality of objects in a reversed manner of the first direction image when the operation for starting the automatic stop processing is received, and sequentially changing a display mode of a status image corresponding to an object that has stopped to a second mode and changing a display state of each of the plurality of operation images to the first or second state based on an instruction from the sulfur chemiluminescence detector.

This display control program enables the user to operate each object to be controlled of the sulfur chemiluminescence detector according to the correct procedure and in a timely manner such that a problem does not occur.

Other features, elements, characteristics, and advantages of the present invention will become more apparent from the following description of preferred embodiments of the present invention with reference to the attached drawings.

DETAILED DESCRIPTION OF THE PREFERRED EMBODIMENTS

Details of an analysis system including a sulfur chemiluminescence detector, a display control method and a non-transitory computer readable medium storing a display control program according to embodiments of the present invention will be described below with reference to drawings.

(1) Configuration of Analysis System

Figure 1:
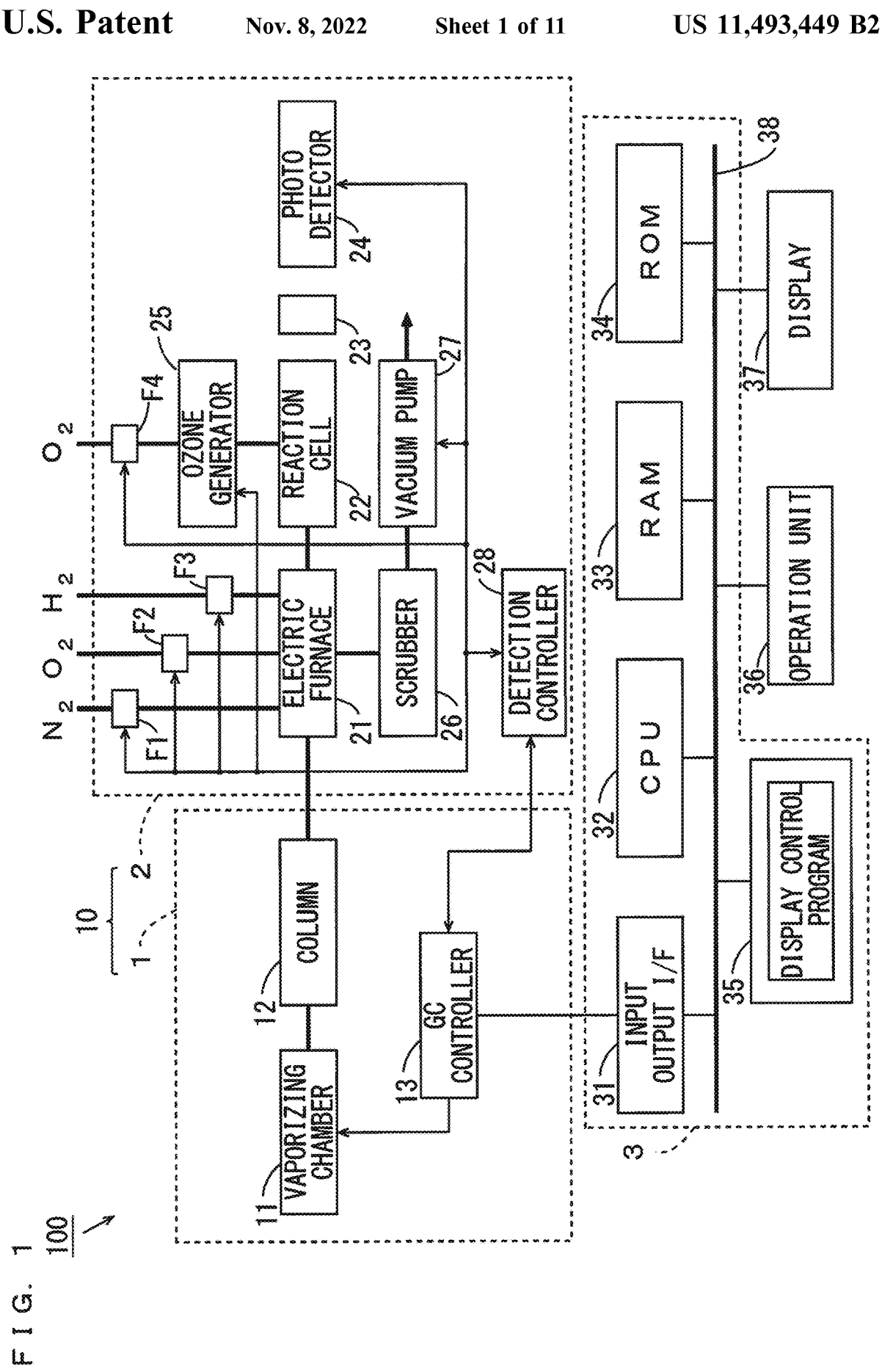
FIG. 1 is a block diagram showing the configuration of an analysis system according to one embodiment of the present invention.

FIG. 1 is a block diagram showing the configuration of the analysis system according to the one embodiment of the present invention. As shown in FIG. 1, the analysis system 100 includes a gas chromatograph 1, a Sulfur Chemiluminescence Detector: hereinafter referred to as an SCD) 2 and a display control device 3. In the present embodiment, the gas chromatograph 1 and the SCD 2 constitute an analysis device 10. FIG. 1 shows the hardware configuration of the analysis system 100.

The gas chromatograph 1 includes a vaporizing chamber 11, a column 12 and a gas chromatograph controller (hereinafter referred to as a GC controller) 13. The SCD 2 includes an electric furnace 21, a reaction cell 22, a filter 23, a photo detector 24, an ozone generator 25, a scrubber 26, a vacuum pump 27 and a detection controller 28.

A sample including a sulfur compound is vaporized in the vaporizing chamber 11 of the gas chromatograph 1 and separated into a plurality of components in the column 12. The components into which the sample is separated are introduced into the electric furnace 21 of the SCD 2. $N_2$ (nitrogen), $O_2$ (oxygen) and $H_2$ (hydrogen) are supplied to the electric furnace 21 through flow rate control devices F1, F2, F3. $O_2$ (oxygen) is supplied to the ozone generator 25 through the flow rate control device F4. Each of the flow rate control devices F1 to F4 includes a valve, a flow rate sensor and the like. Further, the electric furnace 21 includes a temperature sensor.

The electric furnace 21 decomposes the introduced sample by combustion or oxidation and then reduces the decomposed sample. Thus, sulfur monoxide is produced from the sulfur compound included in the sample. The reaction cell 22 is connected to the vacuum pump 27 through the scrubber 26. The product in the electric furnace 21 is introduced into the reaction cell 22 by suction by the vacuum pump 27. The ozone generator 25 generates $O_3$ (ozone) from the supplied $O_2$.

The reaction cell 22 produces sulfur dioxide in an excited state by the reaction of the sulfur monoxide produced by the electric furnace 21 with the $O_3$ produced by the ozone generator 25, and induces chemiluminescence of the sulfur dioxide. The photo detector 24 is a photomultiplier tube, for example. Luminescence of sulfur dioxide is detected by the photo detector 24 through the filter 23. The content of sulfur in the sample can be quantified based on a detection signal of the photo detector 24.

The display control device 3 is constituted by an input output I/F (interface) 31, a CPU (Central Processing Unit) 32, a RAM (Random Access Memory), a ROM (Read Only Memory) 34 and a storage device 35, and is a personal computer or a server, for example. The input output I/F 31, the CPU 32, the RAM 33, the ROM 34 and the storage device 35 are connected to a bus 38. An operation unit 36 and a display 37 are connected to the bus 38 of the display control device 3. The operation unit 36 includes a keyboard, a pointing device and the like and is used for input of various information, data or the like and various operations. The display 37 includes a liquid crystal display, an organic electro-luminescence display or the like, and displays various information and images. The operation unit 36 and the display 37 may be constituted by a touch panel display.

The storage device 35 includes a storage medium such as a hard disc, an optical disc, a magnetic disc, a semiconductor memory, a memory card or the like, and stores a display control program. The RAM 33 is used as a work area for the CPU 32. A system program is stored in the ROM 34. The CPU 32 executes the display control program stored in the storage device 35 on the RAM 33, so that the below-mentioned display control processing is performed.

An ON operation signal and an OFF operation signal, described below, are supplied to the detection controller 28 through the input output I/F 31 and the GC controller 13 from the CPU 32 of the display control device 3. The GC controller 13 controls an operation of each component of the gas chromatograph 1. The detection controller 28 controls a plurality of constituent components of the SCD 2 and transmits various display instructions, described below, to the CPU 32 through the GC controller 13 and the input output I/F 31.

Hereinafter, a plurality of constituent components of the gas chromatograph 1 and the SCD 2 are referred to as a plurality of objects to be controlled. In the present embodiment, the plurality of objects to be controlled are the electric furnace 21, the photo detector 24, the ozone generator 25, the vacuum pump 27, a plurality of flow rate adjustors F1 to F4 and a main switch of the SCD 2, for example. The SCD 2 has the function of performing automatic start-up processing and automatic stop processing.

(2) Operation Screens of Display Control Device 3

Figure 2:
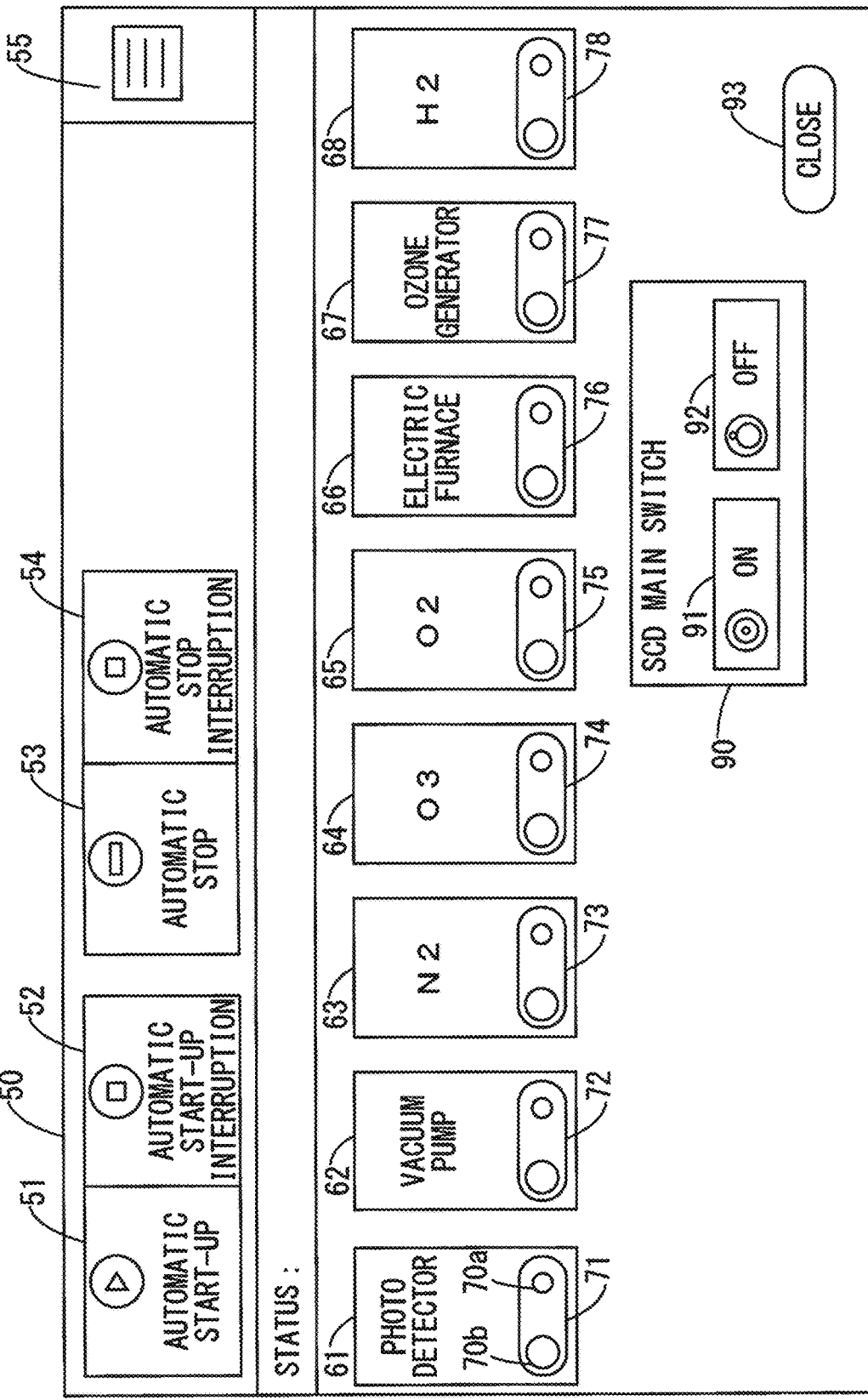
FIG. 2 is a diagram showing an example of an operation screen in preparation for an operation.
Figure 3:
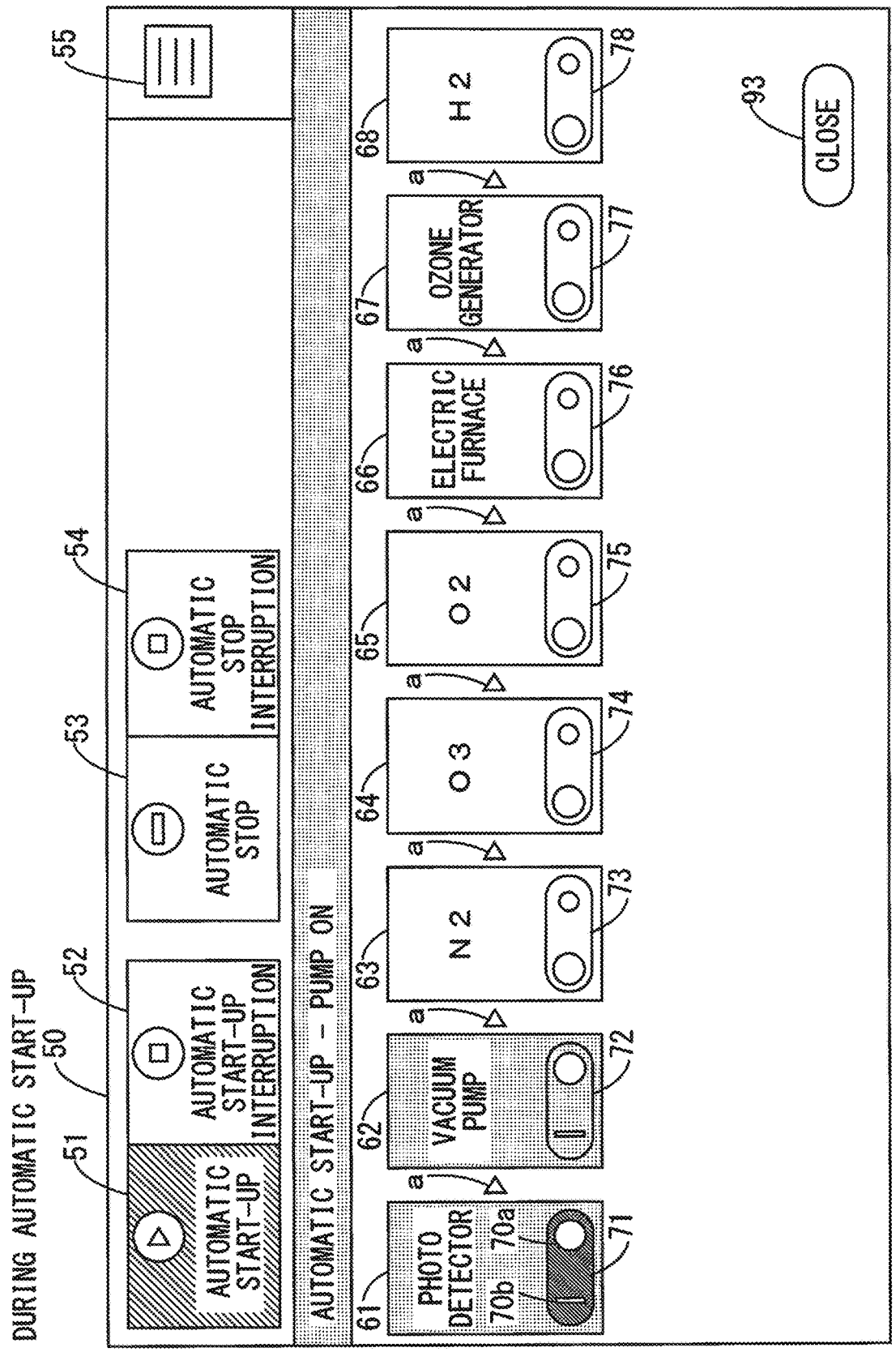
FIG. 3 is a diagram showing an example of the operation screen during automatic start-up processing.
Figure 4:
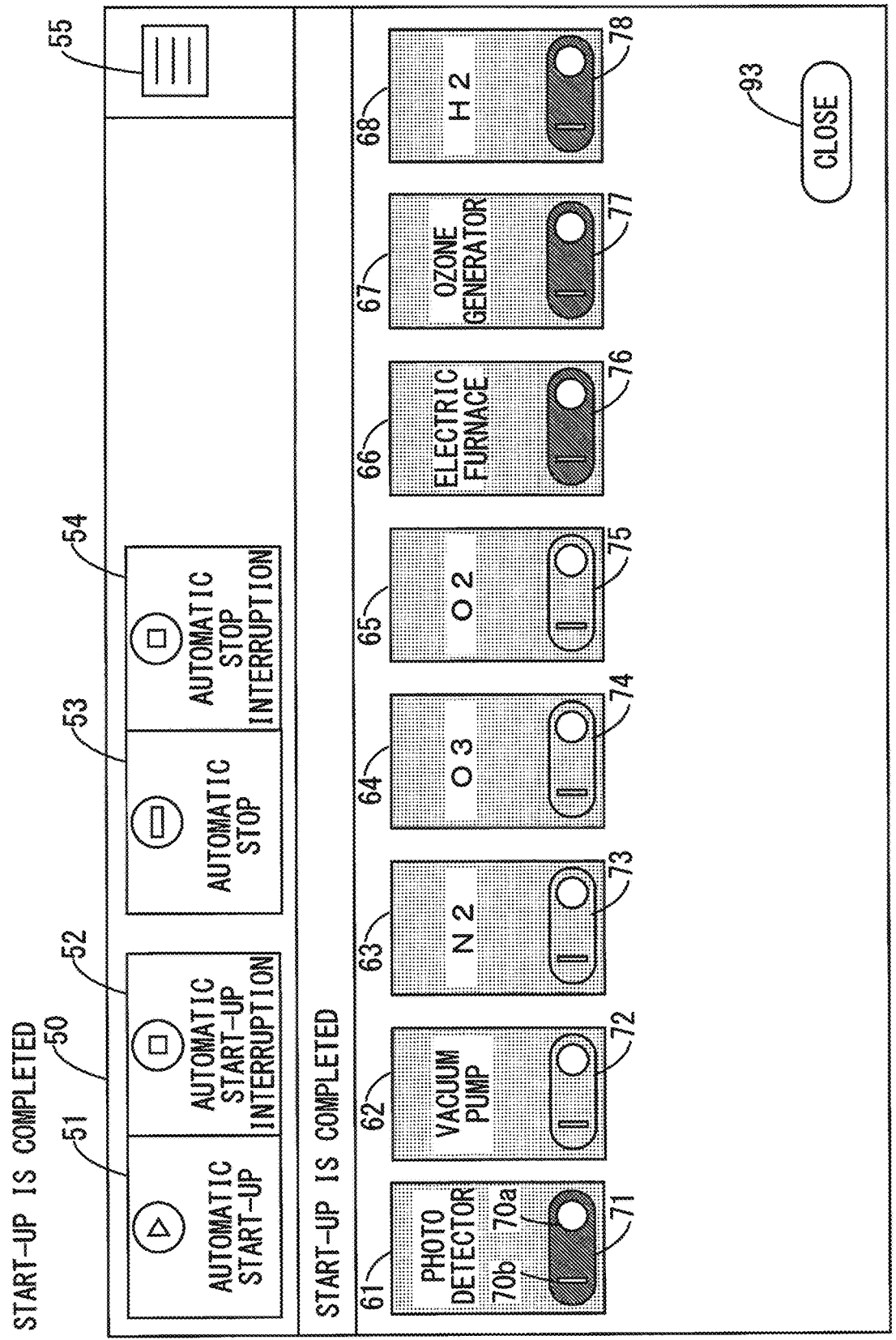
FIG. 4 is a diagram showing an example of the operation screen when start-up is completed.
Figure 5:
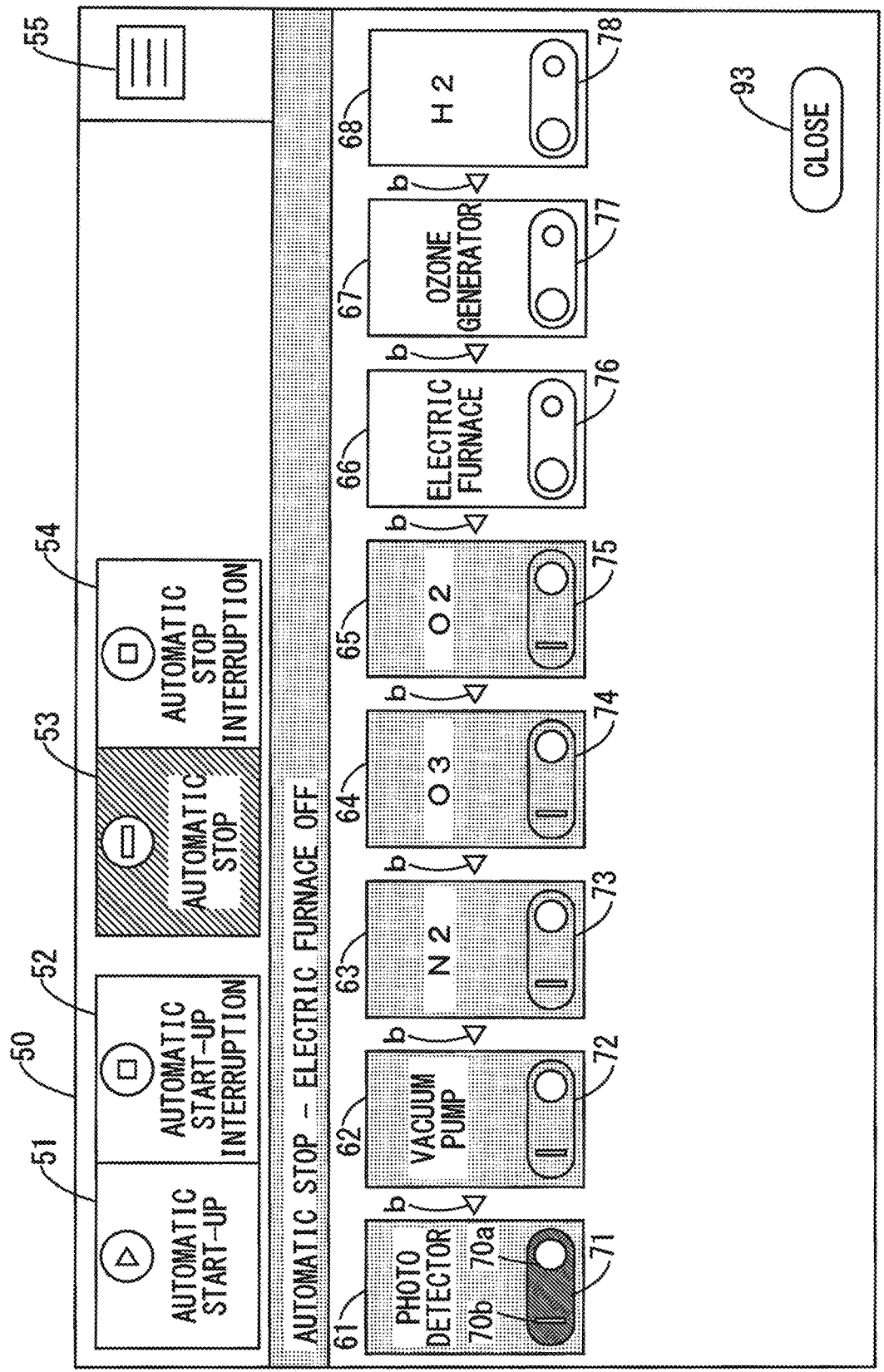
FIG. 5 is a diagram showing an example of the operation screen during automatic stop processing.

An operation screen is displayed in the display 37 connected to the display control device 3. Here, the operation screens displayed in the display 37 will be described. FIG. 2 is a diagram showing an example of an operation screen in preparation for an operation. FIG. 3 is a diagram showing an example of an operation screen during the automatic start-up processing. FIG. 4 is a diagram showing an example of an operation screen when start-up is completed. FIG. 5 is a diagram showing an example of an operation screen during the automatic stop processing.

As shown in FIG. 2, an automatic start-up button 51 for starting the automatic start-up processing, an automatic start-up interruption button 52 for interrupting the automatic start-up processing, an automatic stop button 53 for starting the automatic stop processing and an automatic stop interruption button 54 for interrupting the automatic stop processing are displayed in an upper area of the operation screen 50. Further, a switch button 55 is displayed in the operation screen 50.

A plurality of status images 61 to 68 corresponding to the plurality of objects to be controlled are displayed in the center area of the operation screen 50. In the status images 61 to 68, characters "PHOTO DETECTOR," "VACUUM PUMP," "N2," "O3," "O2," "ELECTRIC FURNACE," "OZONE GENERATOR" and "H2" are respectively displayed.

The status image 61 shows an ON or OFF state of the photo detector 24, and the status image 62 shows an ON or OFF state of the vacuum pump 27. The status image 62 shows a supply state (an ON or OFF state of the flow rate control device F1) of $N_2$ to the electric furnace 21, and the status image 63 shows a supply state or a supply stop state (an ON or OFF state of the flow rate control device F4) of $O_2$ to the ozone generator 25. Here, "$O_3$" means a supply state or a supply stop state of $O_2$ (oxygen) to the ozone generator 25. The status image 65 shows a supply state or a supply stop state (an ON or OFF state of the flow rate control device F2) of $O_2$ to the electric furnace 21. The status image 66 shows an ON or OFF state of the electric furnace 21, and the status image 67 shows an ON or OFF state of the ozone generator 25. The status image 68 shows a supply state or a supply stop state (an ON or OFF state of the flow rate control device F3) of $H_2$ to the electric furnace 21.

Each of the status images 61 to 68 is displayed in a first mode when a corresponding object to be controlled is in the ON state, and is displayed in a second mode when a corresponding object to be controlled is in the OFF state. In the present embodiment, each status image in the first mode is in a first color (blue, for example), and each status image in the second mode is in a second color (white or grey, for example).

Operation images 71 to 78 are displayed in the status images 61 to 68, respectively. Each of the operation images 71 to 78 includes an ON switch 70a and an OFF switch 70b. The operation images 71 to 78 are respectively operated with use of the operation unit 36 for the control of corresponding objects to be controlled. When the ON switch 70a is operated, a corresponding object to be controlled is operated (in the ON state) by the control of the detection controller 28 of the SCD 2. When the OFF switch 70b is operated, a corresponding object to be controlled is stopped (in the OFF state) by the control of the detection controller 28 of the SCD 2.

When the switch button 55 is operated, an SCD main switch 90 is displayed. When an ON button 91 is operated, the SCD main switch 90 is turned on. When an OFF button 92 is operated, the SCD main switch 90 is turned off. A current status is displayed above the plurality of status images 61 to 68. When a closing button 93 is operated, the operation screen 50 switches to another screen.

As shown in FIG. 3, when a user operates the automatic start-up button 51 using the operation unit 36 of FIG. 1, the automatic start-up processing starts. In this case, the display mode of the automatic start-up button 51 changes. In the present embodiment, the color of the automatic start-up button 51 changes to blue, for example. In FIG. 3, the change of the display mode is indicated by hatching.

In the automatic start-up processing, turn-on of the photo detector 24, turn-on of the vacuum pump 27, supply of N2 to the electric furnace 21 (hereinafter, referred to as ON of "N2"), supply of O2 to the ozone generator 25 (hereinafter referred to as ON of "O3"), supply of O2 to the electric furnace 21 (hereinafter referred to as ON of "O2"), turn-on of the electric furnace 21, turn-on of the ozone generator 25 and supply of H2 to the electric furnace 21 (hereinafter referred to as ON of "H2") are performed in this order.

The plurality of status images 61 to 68 are arranged from the left to right in the order in which the corresponding objects are turned on. The display mode of each of the status images 61 to 68 changes when a corresponding object is turned on. In the present embodiment, the color (background color) of a status image corresponding to the object in the ON state of the plurality of status images 61 to 68 changes to the first color (blue, for example). The color (background color) of a status image corresponding to the object that is not in the ON state is kept in the second color (grey, for example). In FIG. 3, a dotted pattern is applied to the status image 61 corresponding to the photo detector 24 in the ON state and the status image 62 corresponding to the vacuum pump 27 in the ON state.

Further, first direction images indicating the order in which the plurality of objects to be controlled are turned on in the automatic start-up processing are displayed between the plurality of status images 61 to 68. In the present embodiment, rightward arrows 'a' are displayed between the plurality of status images 61 to 68 as the first direction images.

Further, an operable operation image is in a first state, and an inoperable operation image is in a second state. In the present embodiment, the first state is a first color density (a dark color, for example), and the second state is a second color density (a light color, for example). In the example of FIG. 3, the operation image 71 corresponding to the photo detector 24 is displayed in a dark color, and the other operation images 72 to 78 are displayed in a light color. Thus, the ON and OFF operations of the operation image 71 corresponding to the photo detector 24 can be performed, and the ON and OFF operations of the operation images 72 to 78 corresponding to the other objects to be controlled cannot be performed. Whether the plurality of operation images 71 to 78 are operable or not changes based on start-up conditions, described below.

In an operation image corresponding to an object to be controlled in the ON state, the ON switch 70a is displayed in a first shape (a large circle in the present example), and the OFF switch 70b is displayed in a second shape (a vertical bar in the present example). As the current state, "AUTOMATIC START-UP-PUMP ON" meaning that the vacuum pump 27 is in the ON state in the automatic start-up processing is displayed.

When the user operates the automatic start-up interruption button 52 using the operation unit 36 during the automatic start-up processing, the automatic start-up processing is interrupted. In this case, the display mode of the automatic start-up button 51 returns to the display mode before the automatic start-up processing is started.

In this case, the ON and OFF states of the plurality of objects to be controlled are kept temporarily. In this state, the user can turn on and off the corresponding objects to be controlled by operating the operable operation images. In the state of FIG. 3, when the automatic start-up interruption button 52 is operated, the user can switch the ON and OFF states of the photo detector 24 by operating the operation image 71. On the other hand, the user cannot operate the other operation images 72 to 78.

The user can restart the automatic start-up processing by operating the automatic start-up button 51 again. In this case, the operations (turning on and off) of the objects are controlled in order such that the below-mentioned start-up conditions are satisfied. At the same time, the display modes of the plurality of status images 61 to 68 and the states of the plurality of operation images 71 to 78 change.

When all of the objects required for the automatic start-up processing are turned on, the automatic start-up processing is completed. Thus, as shown in FIG. 4, the plurality of status images 61 to 68 are in the first mode. In the present embodiment, the plurality of status images 61 to 68 are in the first color. Further, the operable operation images of the plurality of operation images 71 to 78 are in the first state. Further, the rightward arrows 'a' are erased. In the example of FIG. 4, the color of the operation images 71, 76, 77, 78 changes to the dark color. In this case, the ON and OFF states of the photo detector 24, the ON and OFF states of the electric furnace 21, the ON and OFF states of the ozone generator 25 and the supply state and supply stop state of $H_2$ can be switched.

As shown in FIG. 5, when the user operates the automatic stop button 53 using the operation unit 36 of FIG. 1, the automatic stop processing starts. In this case, the display mode of the automatic stop button 53 changes. In the present embodiment, the color of the automatic stop button 53 changes to blue, for example. In FIG. 5, the change of the display mode is indicated by hatching.

In the automatic stop processing, stop of the supply of $H_2$ to the electric furnace 21 (hereinafter referred to as OFF of "H2"), turn-off of the ozone generator 25, turn-off of the electric furnace 21, stop of the supply of $O_2$ to the electric furnace 21 (hereinafter referred to as OFF of "O2"), stop of the supply of $O_2$ to the ozone generator 25 (hereinafter referred to as OFF of "O3"), stop of the supply of $N_2$ to the electric furnace 21 (hereinafter referred to as OFF of "N2"), turn-off of the vacuum pump 27 and then turn-off of the photo detector 24 are performed in this order.

The plurality of status images 68 to 61 are arranged from the right to left in the order in which the corresponding objects to be controlled are turned off. The display mode of each of the status images 68 to 61 changes when a corresponding object to be controlled is turned off. In the present embodiment, the color (background color) of a status image corresponding to the object in the OFF state of the plurality of status images 68 to 61 changes to the second color (grey, for example). The color (background color) of a status image corresponding to the object that is not in the OFF state is kept in the first color (blue, for example). In FIG. 5, the status image 68 corresponding to the "H2" in the OFF state, the status image 67 corresponding to the ozone generator 25 in the OFF state and the status image 66 corresponding to the electric furnace 21 in the OFF state are in grey.

Further, second direction images indicating the order in which the plurality of objects to be controlled are turned off in the automatic stop processing are displayed between the plurality of status images 68 to 61. In the present embodiment, leftward arrows 'b' are displayed between the plurality of status images 68 to 61 as the second direction images.

Further, an operable operation image is in the first state, and an inoperable operation image is in the second state. In the example of FIG. 5, the operation image 71 corresponding to the photo detector 24 is displayed in the dark color, and the other operation images 72 to 78 are displayed in the light color. Thus, the ON and OFF operations of the operation image 71 corresponding to the photo detector 24 can be performed, and the ON and OFF operations of the operation images 72 to 78 corresponding to the other objects to be controlled cannot be performed. Whether the plurality of operation images 71 to 78 are operable or not changes based on stop conditions, described below. As a current state, "AUTOMATIC STOP-ELECTRIC FURNACE OFF" meaning that the electric furnace 21 is in the OFF state in the automatic stop processing is displayed.

When the user operates the automatic stop interruption button 54 using the operation unit 36 during the automatic stop processing, the automatic stop processing is interrupted. In this case, the display mode of the automatic stop button 53 returns to the display mode before the automatic stop processing is started.

In this case, the ON and OFF states of the plurality of objects to be controlled are kept temporarily. In this state, the user can turn on and off the corresponding objects to be controlled by operating the operable operation images. In the state of FIG. 5, when the automatic stop interruption button 54 is operated, the user can switch the ON and OFF states of the photo detector 24 by operating the operation image 71. On the other hand, the user cannot operate the other operation images 72 to 78.

The user can restart the automatic stop processing by operating the automatic stop button 53 again. In this case, the operations (turning on and off) of the objects to be controlled are controlled in order such that the below-mentioned stop conditions are satisfied. At the same time, the display modes of the plurality of status images 68 to 61 and the states of the plurality of operation images 78 to 71 change.

When all of the objects required for the automatic stop processing are turned off, the automatic stop processing is completed. Thus, the operation screen 50 returns to the operation screen 50 shown in FIG. 2. Further, the leftward arrows 'b' are removed.

(3) Operation Conditions

Figure 6:
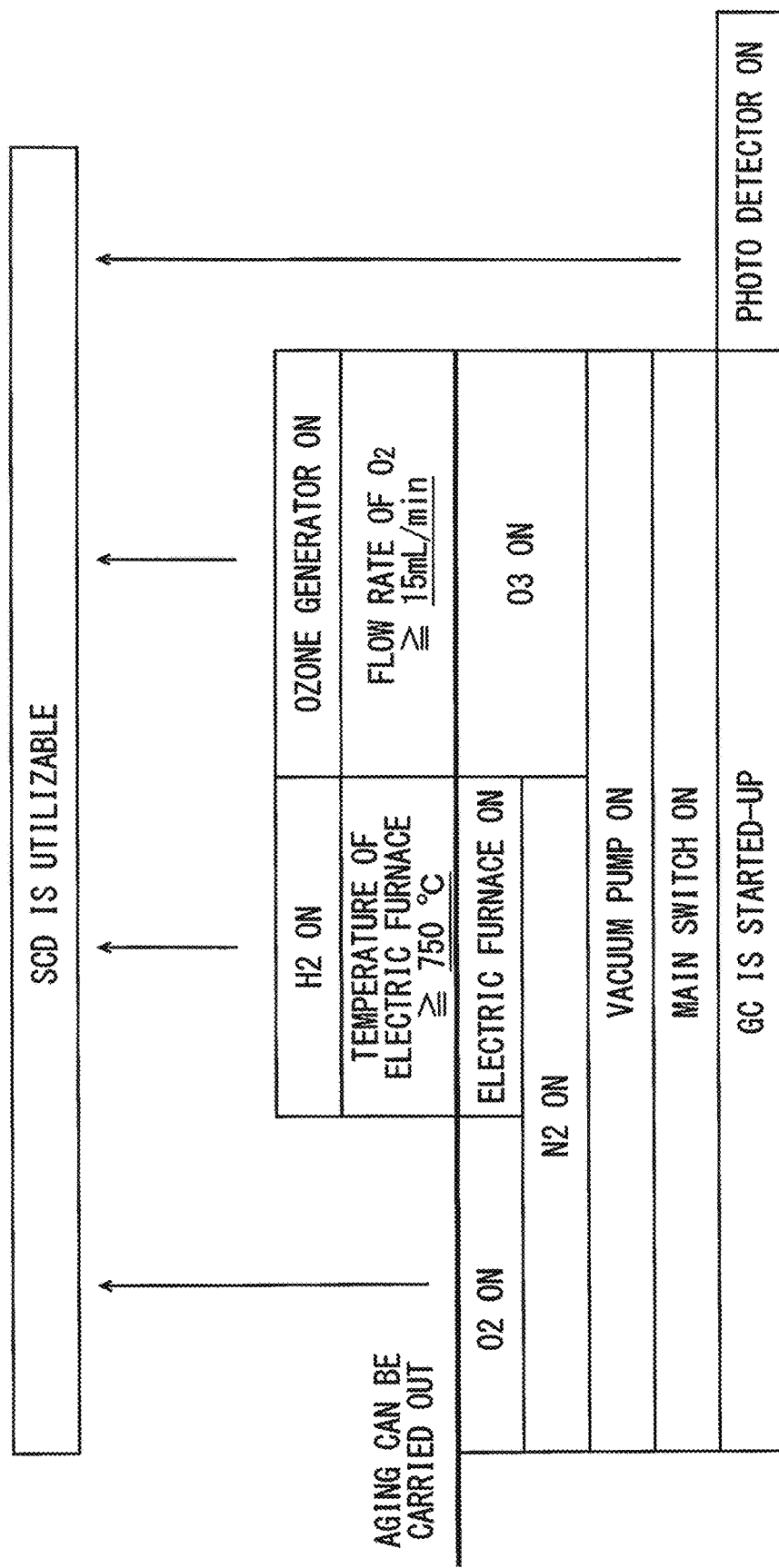
FIG. 6 is a schematic diagram showing start-up conditions of an SCD.
Figure 7:
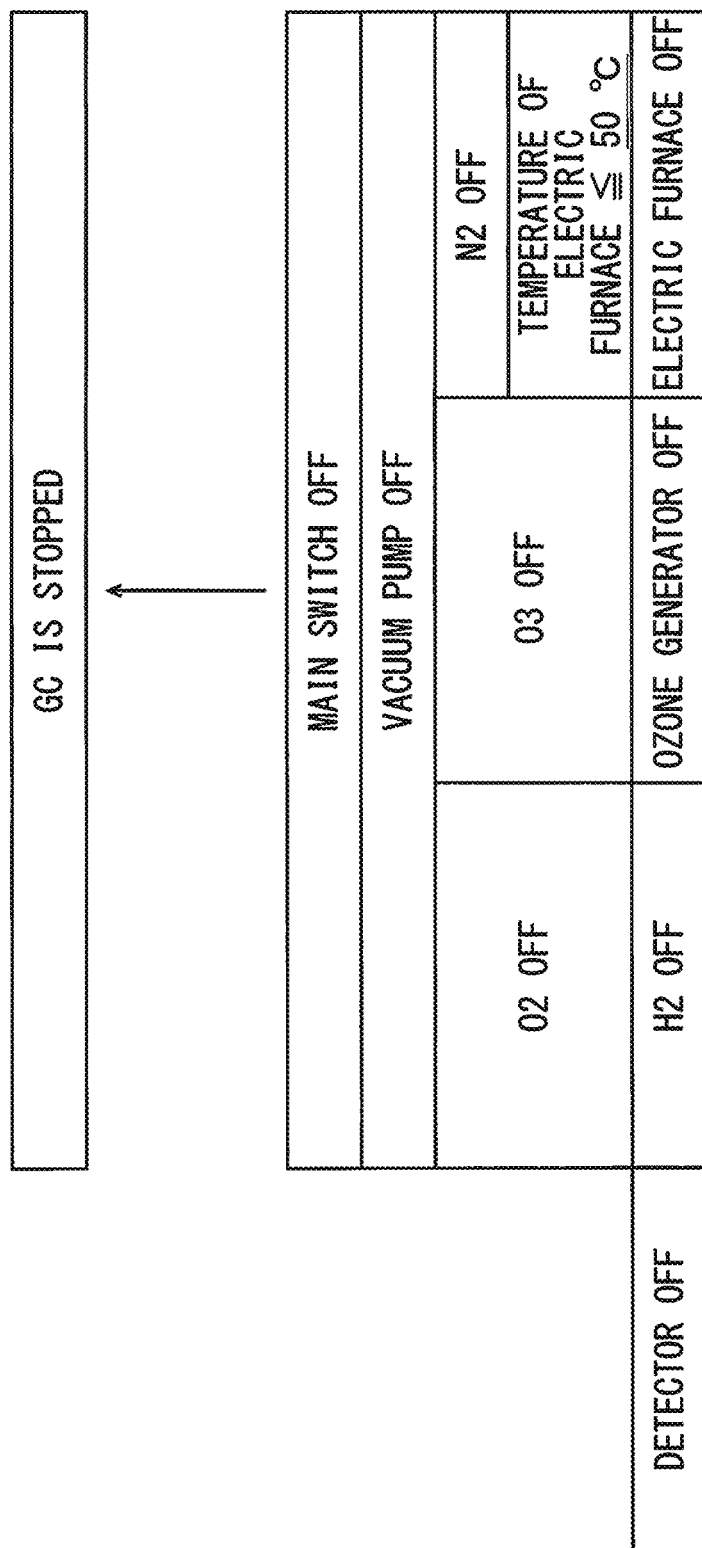
FIG. 7 is a schematic diagram showing stop conditions of the SCD.

In the detection controller 28 of the SCD 2 of FIG. 1, the operation conditions of the SCD 2 are stored in advance. The operation conditions include the start-up conditions in the start-up processing of the SCD 2 and the stop conditions in the stop processing of the SCD 2. FIG. 6 is a schematic diagram showing the start-up conditions of the SCD 2. FIG. 7 is a schematic diagram showing the stop conditions of the SCD 2.

The start-up conditions of FIG. 6 show that the plurality of objects are required to be controlled from the bottom to the top in order. For example, the condition for making "H2"

be in the ON state is that the temperature of the electric furnace 21 is equal to or higher than 750° C. The condition for making the temperature of the electric furnace 21 be equal to or higher than 750° C. is that the electric furnace 21 is in the ON state. The condition for turning on the electric furnace 21 is that "N2" is in the ON state. The condition for making "N2" be in the ON state is that the vacuum pump 27 is in the ON state. The condition for turning on the vacuum pump 27 is that the SCD main switch 90 is in the ON state. The condition for turning on the SCD main switch 90 is that the gas chromatograph 1 has been started up.

The condition for turning on the ozone generator 25 is that the flow rate of $O_2$ in the ozone generator 25 is equal to or higher than 15 mL/min. The condition for making the flow rate of $O_2$ in the ozone generator 25 be equal to or higher than 15 mL/min is that "O3" is in the ON state ($O_2$ is supplied to the ozone generator 25.) The condition for making "$O_3$" be in the ON state (the condition for supplying $O_2$ to the ozone generator 25) is that the vacuum pump 27 is in the ON state. The condition for turning on the vacuum pump 27 is that the SCD main switch 90 is in the ON state. The condition for turning on the SCD main switch 90 is that the gas chromatograph 1 has been started up.

The condition for making "O2" be in the ON state is that "N2" is in the ON state. The condition for making "N2" be in the ON state is that the vacuum pump 27 is in the ON state. The condition for turning on the vacuum pump 27 is that the SCD main switch 90 is in the ON state. The condition for turning on the SCD main switch 90 is that the gas chromatograph 1 has been started up.

The photo detector 24 can turned on at any time independently from other conditions. The condition for making the SCD 2 be utilizable is that "O2" is in the ON state, "H2" is in the ON state, the ozone generator 25 is in the ON state, and the photo detector 24 is in the ON state. Further, aging (running-in) can be carried out at the time when the electric furnace 21, "O2" and "O3" are put in the ON state.

The detection controller 28 determines the state of each of the operation images 71 to 78 during the automatic start-up processing and the automatic start-up interruption based on the above-mentioned start-up conditions.

The stop conditions of FIG. 7 show that the plurality of objects are required to be controlled from the bottom to the top in order. For example, the condition for turning off the SCD main switch 90 is that the vacuum pump 27 is in the OFF state. The condition for turning off the vacuum pump 27 is that "O2," "O3" and "N2" are in the OFF state. The condition for making "O2" be in the OFF state is that "H2" is in the OFF state. The condition for making "O3" be in the OFF state is that the ozone generator 25 is in the OFF state. The condition for making "N2" be in the OFF state is that the temperature of the electric furnace 21 is equal to or lower than 50° C. The condition for making the temperature of the electric furnace 21 be equal to or lower than 50° C. is that the electric furnace 21 is in the OFF state.

The photo detector 24 can be turned off at any time independently from other conditions. The condition for stopping the gas chromatograph 1 is that the SCD main switch 90 is in the OFF state.

The detection controller 28 determines the state of each of the operation images 71 to 78 during the automatic stop processing and the automatic stop interruption based on the above-mentioned stop conditions.

(4) Functional Configuration of Display Control Device 3

Figure 8:
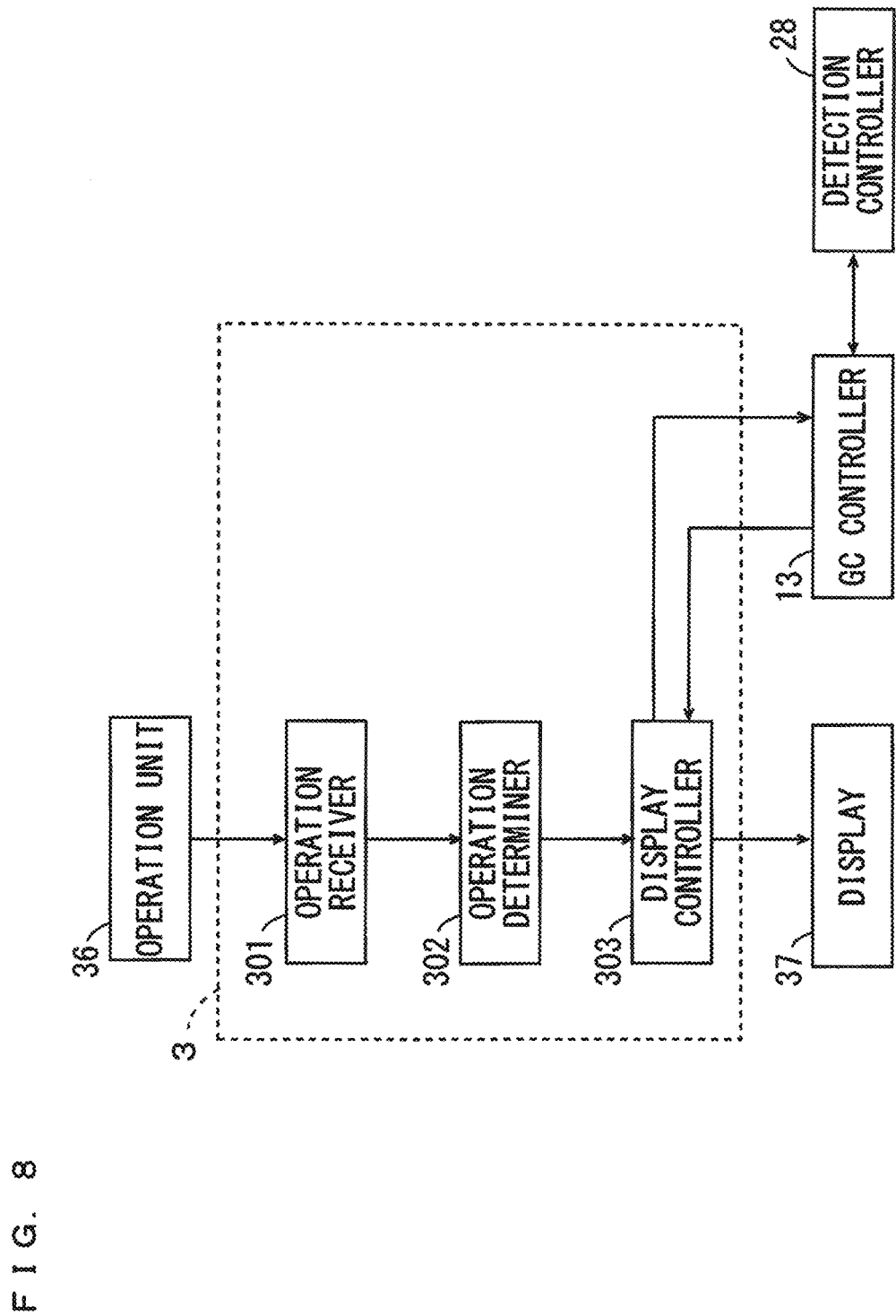
FIG. 8 is a block diagram showing the functional configuration of a display control device of FIG. 1.

FIG. 8 is a block diagram showing the functional configuration of the display control device 3 of FIG. 1. As shown in FIG. 8, the display control device 3 includes an operation receiver 301, an operation determiner 302 and a display controller 303. The functions of the above-mentioned constituent elements (301 to 303) are realized by execution of the display control program, which is a computer program stored in a storage medium (recording medium) such as the storage device 35 by the CPU 32 of FIG. 1. Part or all of the constituent elements of the display control device 3 may be realized by hardware such as an electronic circuit.

The operation receiver 301 receives an operation performed with use of the operation unit 36. In this case, the user can operate each part of the operation screen 50 displayed in the display 37 using the operation unit 36. For example, when the operation unit 36 is a mouse, the user can perform a desired operation by moving a cursor and clicking on the operation screen 50. Further, when the operation unit 36 and the display 37 are a touch panel display, the user can perform a desired operation by touching a desired part of the operation screen 50.

The operation determiner 302 determines an operation received by the operation receiver 301. For example, the operation determiner 302 determines that the automatic start-up button 51, the automatic start-up interruption button 52, the automatic stop button 53, the automatic stop interruption button 54, the operation images 71 to 78, the main switch 90 and so on have been operated.

The detection controller 28 of the SCD 2 stores the start-up conditions of FIG. 6 and the stop conditions of FIG. 7. Further, the detection controller 28 determines whether each object to be controlled satisfies the start-up conditions or the stop conditions, and determines the state of each object to be controlled (the ON or OFF state). Further, the detection controller 28 transmits a working display instruction, a stop display instruction, an operable display instruction and an inoperable display instruction to the display controller 303 through the GC controller 13 based on the result of determination. Here, the working display instruction is an instruction for displaying each status image on the operation screen 50 in the first mode. The stop display instruction is an instruction for displaying each status image on the operation screen 50 in the second mode. The operable display instruction is an instruction for displaying each operation image on the operation screen 50 in the first state. The inoperable display instruction is an instruction for displaying each operation image on the operation screen 50 in the second state.

The display controller 303 displays the operation screen 50 in the display 37 based on the instruction received from the detection controller 28 of the SCD 2. Further, when the operation image in the first state is operated, the display controller 303 transmits an ON operation signal or an OFF operation signal to the detection controller 28 through the GC controller 13. In this case, the detection controller 28 turns on or off the corresponding object to be controlled based on the ON operation signal or the OFF operation signal.

(5) Display Control Program

The algorithm of the display control program will be described with reference to FIGS. 9 to 11. The display control method is performed by execution of the display control program. The display control program includes the automatic start-up processing, the automatic start-up interruption processing, the automatic stop processing and the automatic stop interruption processing.

Figure 9:
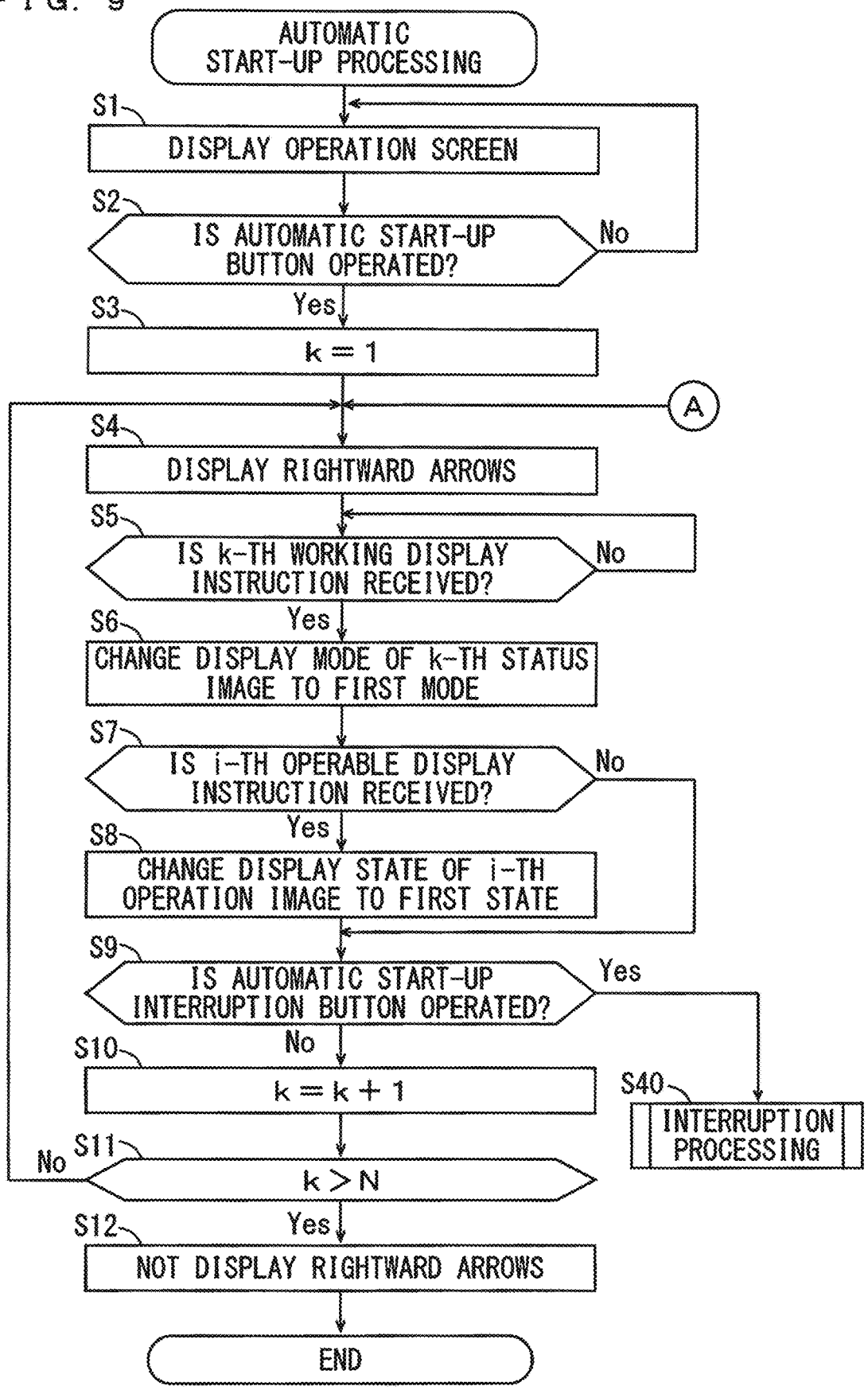
FIG. 9 is a flow chart showing automatic start-up processing.

FIG. 9 is a flow chart showing the automatic start-up processing. Here, the number of the plurality of objects to be controlled is N. Further, the plurality of objects to be controlled are denoted with the numerals 1 to N in accordance with the order in which the objects to be controlled are switched to the ON state. First, in the automatic start-up processing, the display controller 303 causes the display 37 to display the operation screen 50 based on a user's operation using the operation unit 36 (step S1). The operation determiner 302 determines whether the automatic start-up button 51 has been operated (step S2). When the automatic start-up button 51 is not operated, the operation determiner 302 returns to the step S1.

When the automatic start-up button 51 is operated, the display controller 303 sets a variable k to 1 (step S3). The display controller 303 causes the rightward arrows 'a' to be displayed between the plurality of status images 61 to 68 (step S4). Here, when a k-th object is turned on, the detection controller 28 transmits a k-th working display instruction to the display controller 303. The display controller 303 determines whether the working display instruction corresponding to the k-th object has been received from the detection controller 28 (step S5). When the working display instruction corresponding to the k-th object is received, the display controller 303 changes the display mode of the k-th status image to the first mode (the first color, for example) (step S6).

The detection controller 28 determines whether the i-th object satisfies the start-up conditions. Here, i is 1 to N. When an i-th object satisfies the start-up conditions, the detection controller 28 transmits an i-th operable display instruction corresponding to the i-th object to the display controller 303. The display controller 303 determines whether the i-th operable display instruction has been received (step S7). When the i-th operable display instruction is received, the display controller 303 changes the state of the i-th operation image to the operable first state (the dark color, for example) (step S8). When the i-th operable signal is not received in the step S7, the display controller 303 skips the step S8. In this case, the i-th operation image is kept in the inoperable second state (the light color, for example).

The operation determiner 302 determines whether the automatic start-up interruption button 52 has been operated (step S9). When the automatic start-up interruption button 52 is operated, the operation determiner 302 proceeds to the interruption processing of FIG. 11 (step S40). When the automatic start-up interruption button 52 is not operated, the operation determiner 302 adds 1 to the value of the variable k (step S10), and determines whether the value of the variable k is larger than N (step S11).

When the value of the variable k is equal to or smaller than N, the display controller 303 returns to the step S4. Thus, the processing of the steps S4, S5, S6, S7, S8, S9, S10, S11 and S40 are performed until the variable k becomes N. When the value of the variable k is larger than N in the step S11, the display controller 303 does not display the rightward arrows 'a' (step S12).

Thus, the automatic start-up processing is completed. As a result, the first to N-th objects are turned on by the detection controller 28, and the display modes of the first to N-th status images are changed to the first mode.

Figure 10:
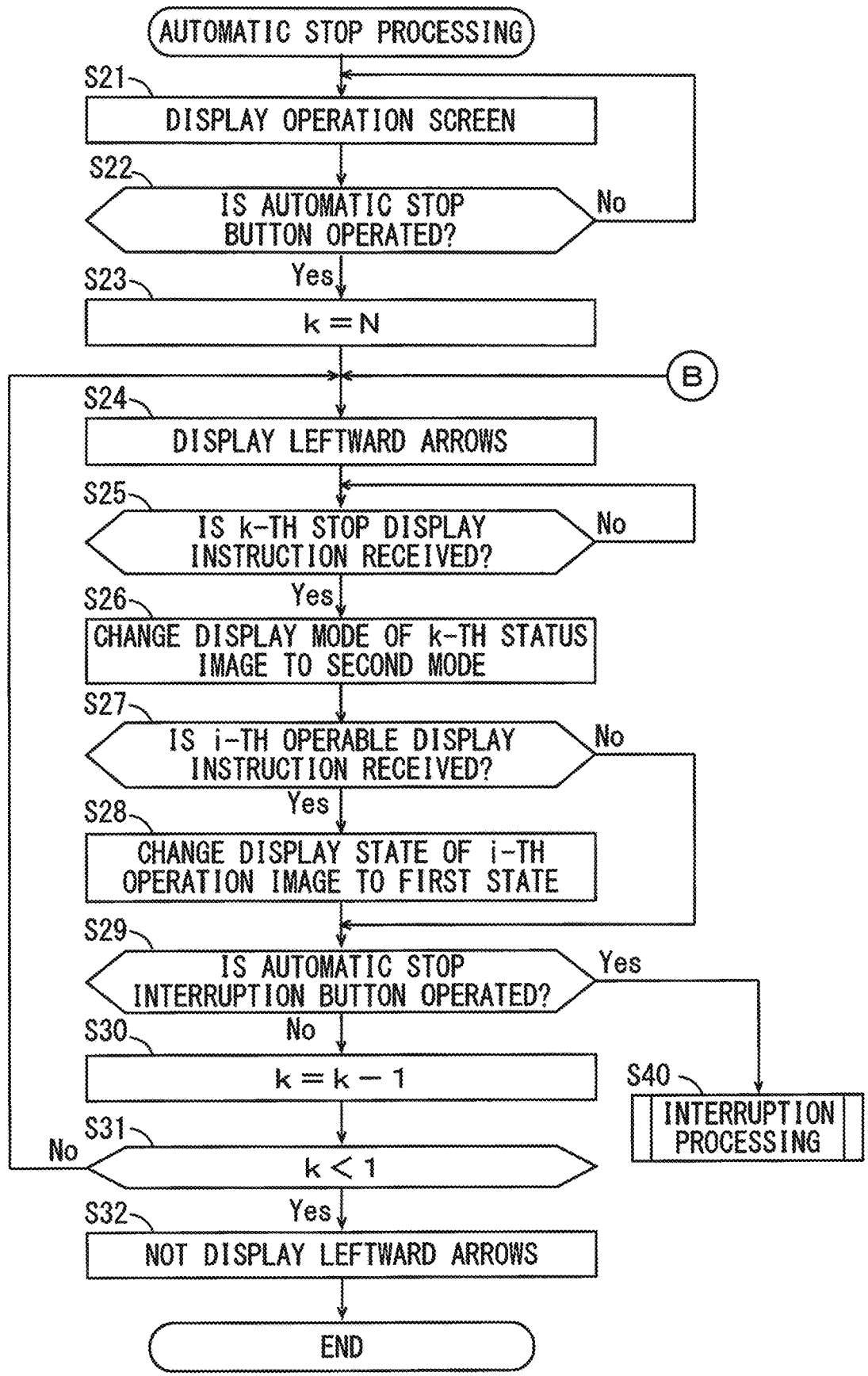
FIG. 10 is a flow chart showing automatic stop processing.

FIG. 10 is a flow chart showing the automatic stop processing. First, in the automatic stop processing, the display controller 303 causes the display 37 to display the operation screen 50 based on a user's operation using the operation unit 36 (step S21). The operation determiner 302 determines whether the automatic stop button 53 has been operated (step S22). When the automatic stop button 53 is not operated, the operation determiner 302 returns to the step S21.

When the automatic stop button 53 is operated, the operation determiner 302 sets the variable k to N (step S23). The display controller 303 causes the leftward arrows 'b' to be displayed between the plurality of status images 61 to 68 (step S24). Here, when the k-th object is turned off, the detection controller 28 transmits the k-th stop display instruction to the display controller 303. The display controller 303 determines whether the stop display instruction corresponding to the k-th object has been received from the detection controller 28 (step S25). When the stop display instruction corresponding to the k-th object is received, the display controller 303 changes the display mode of the k-th status image to the second mode (the second color, for example) (step S26).

The detection controller 28 determines whether an i-th object satisfies the stop conditions. Here, i is 1 to N. When the i-th object satisfies the stop conditions, the detection controller 28 transmits the i-th operable display instruction corresponding to the i-th object to the display controller 303. The display controller 303 determines whether the i-th operable display instruction has been received (step S27). When the i-th operable display instruction is received, the display controller 303 changes the display state of the i-th operation image to the operable first state (the dark color, for example) (step S28). When the i-th operable signal is not received in the step S27, the display controller 303 skips the step S28. In this case, the i-th operation image is kept in the inoperable second state (the light color, for example).

The operation determiner 302 determines whether the automatic stop interruption button 54 has been operated (step S29). When the automatic stop interruption button 54 is operated, the operation determiner 302 proceeds to the interruption processing of FIG. 11 (step S40). When the automatic stop interruption button 54 is not operated, the operation determiner 302 subtracts 1 from the value of the variable k (step S30), and determines whether the value of the variable k is smaller than 1 (step S31).

When the value of the variable k is equal to or larger than 1, the display controller 303 returns to the step S24. Thus, the processing of the steps S24, S25, S26, S27, S28, S29, S30, S31 and S40 is performed until the variable k becomes 1. When the value of the variable k is smaller than 1 in the step S31, the display controller 303 does not display the leftward arrows 'b' (step S32).

Thus, the automatic stop processing is completed. As a result, the N-th to the first objects are turned off, and the display modes of the N-th to the first status images are changed to the second mode.

Figure 11:
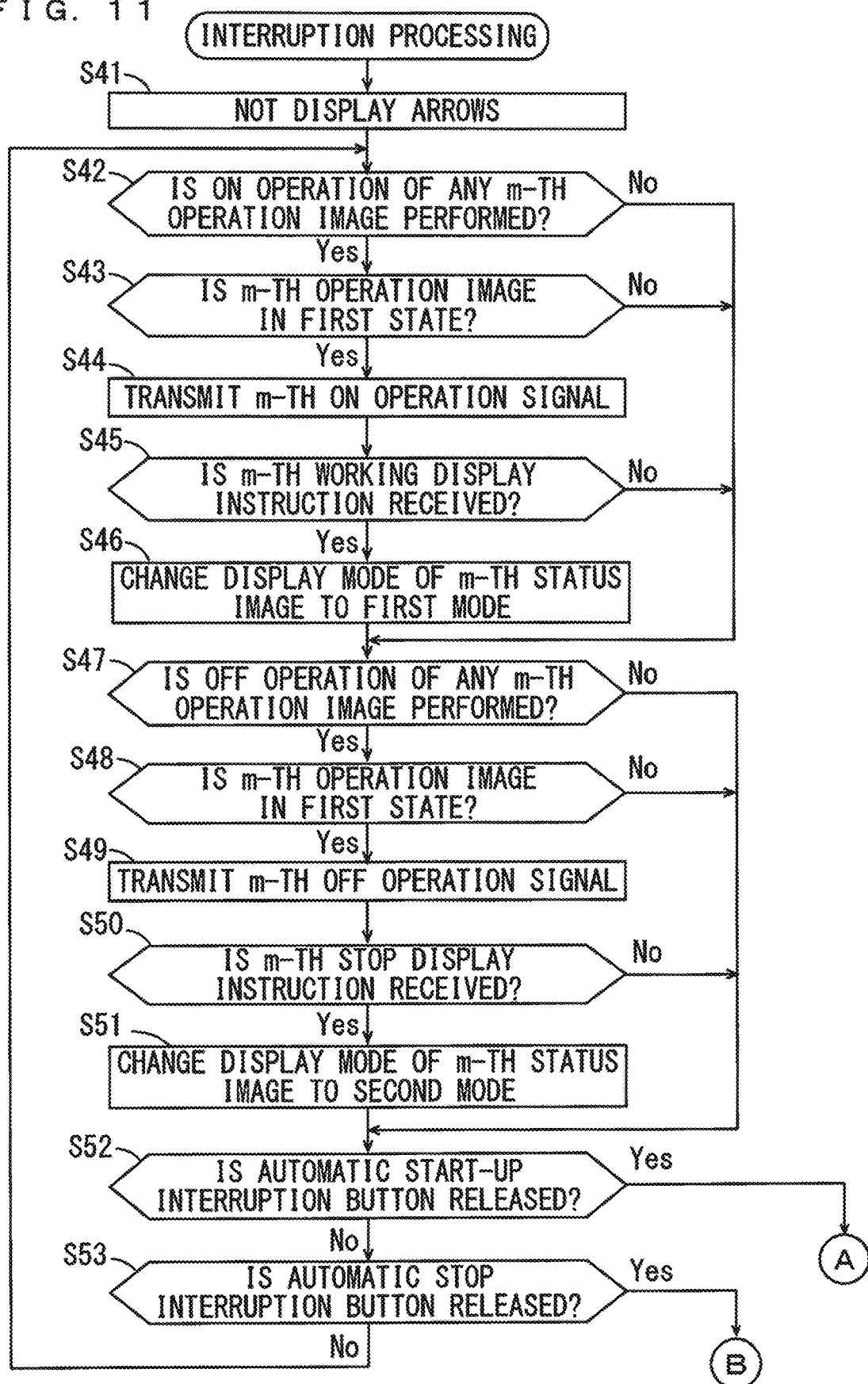
FIG. 11 is a flow chart showing interruption processing.

FIG. 11 is a flow chart showing the interruption processing. The interruption processing of FIG. 11 is the interruption processing in the automatic start-up processing or the interruption processing in the automatic stop processing. In the interruption processing, the detection controller 28 of the SCD 2 keeps the ON and OFF states of the plurality of objects temporarily.

In the interruption processing, the display controller 303 does not display the rightward arrows 'a' and the leftward arrows 'b' in the operation screen 50 (step S41). The operation determiner 302 determines whether an ON operation of any m-th operation image has been performed (step S42). When the ON operation of the m-th operation image is performed, the display controller 303 determines whether the m-th operation image is in the operable first state (the dark color, for example) (step S43). When the m-th operation image is in the first state, the display controller 303 transmits the m-th ON operation signal corresponding to the m-th object to the detection controller 28 (step S44). The detection controller 28 turns on the m-th object based on the m-th ON operation signal, and transmits the m-th working display instruction corresponding to the m-th object to the detection controller 28. The display controller 303 determines whether the m-th working display instruction has been received from the detection controller 28 (step S45). When the m-th working display instruction is received, the display controller 303 changes the display mode of the m-th status image to the first mode (the first color, for example) (step S46).

When the ON operation of the m-th operation image is not performed in the step S42, the m-th operation image is in the second mode (the light color, for example) in the step S43 or the m-th working display instruction is not received in the step S45, the operation determiner 302 proceeds to the step S47.

In the step S47, the operation determiner 302 determines whether an OFF operation of any m-th operation image has been performed. When the OFF operation of the m-th operation image is performed, the display controller 303 determines whether the m-th operation image is in the operable first state (the dark color, for example) (step S48). When the m-th operation image is in the first state, the display controller 303 transmits an m-th OFF operation signal corresponding to the m-th object to the detection controller 28 (step S49). The detection controller 28 turns off the m-th object based on the m-th OFF operation signal, and transmits an m-th stop display instruction corresponding to the m-th object to the detection controller 28. The display controller 303 determines whether the m-th stop display instruction has been received from the detection controller 28 (step S50). When the m-th stop display instruction is received, the display controller 303 changes the display mode of the m-th status image to the second mode (the second color, for example) (step S51).

When the OFF operation of the m-th operation image is not performed in the step S47, the m-th operation image is in the second mode (the light color, for example) in the step S48, or the m-th stop display instruction is not received in the step S50, the operation determiner 302 proceeds to the step S52.

In the step S52, the operation determiner 302 determines whether the automatic start-up interruption button 52 has been released in the interruption processing of the automatic start-up processing. When the automatic start-up interruption button 52 has been released in the interruption processing of the automatic start-up processing, the operation determiner 302 proceeds to the step S4 of FIG. 9. Thus, the automatic start-up processing restarts.

In the step S53, the operation determiner 302 determines whether the automatic stop interruption button 54 has been released in the interruption processing of the automatic stop processing. When the automatic stop interruption button 54 has been released in the interruption processing of the automatic stop processing, the operation determiner 302 proceeds to the step S24 of FIG. 10. Thus, the automatic stop processing restarts. When the automatic start-up interruption button 52 is not released in the step S52 or the automatic stop interruption button 54 is not released in the step S53, the operation determiner 302 returns to the step S42.

(6) Effects of Embodiment

The display control device 3 according to the present embodiment enables the user to easily perform the automatic start-up processing, the automatic start-up interruption processing, the automatic stop processing and the automatic stop interruption processing by operating the automatic start-up button 51, the automatic start-up interruption button 52, the automatic stop button 53 and the automatic stop interruption button 54 on the operation screen 50. In the automatic start-up processing, the user can easily and visually identify the working order of the objects to be controlled due to the arrangement of the status images 61 to 68 and the display of the rightward arrows 'a.' Similarly, in the automatic stop processing, the user can easily and visually identify the stopping order of the objects to be controlled due to the arrangement of the status images 61 to 68 and the display of the leftward arrows 'b.'

Because the rightward arrows 'a' and the leftward arrows 'b' are not displayed after the automatic start-up processing is completed and after the automatic stop processing is completed, the user can easily identify the completion of the automatic start-up processing or the automatic stop processing.

Further, the user can easily and visually identify whether each object to be controlled has worked or has stopped based on the display modes of the status images 61 to 68. Further, the user can easily and visually identify whether each object to be controlled is operable or inoperable based on the display states of the operation images 71 to 78.

In this case, because the operation images 71 to 78 in the second state of the operation images 71 to 78 are inoperable, the user is prevented from turning on or off each object in the incorrect order or in an untimely manner and causing a problem such as performance deterioration or a malfunction in the analysis device 10.

Therefore, even the user who does not have an advanced knowledge of the operations of the SCD 2 can easily carry out maintenance or troubleshooting of each object to be controlled without causing a problem in the analysis device 10.

(7) Other Embodiments

While the first and second modes of the status images 61 to 68 are different colors of the state images 61 to 68 in the above-mentioned embodiment, the first and second modes are not limited to this. For example, the first and second modes of the status images 61 to 68 may be continuous lighting up and blinking of the status images 61 to 68, or vice versa. The first and second modes of the status images 61 to 68 may be different luminances (brightnesses) or may be different shapes. Alternatively, the first and second modes of the status images 61 to 68 may be presence and absence of a specific character, or the first and second modes of the status images 61 to 68 may be display of different characters.

While the first and second states of the operation images 71 to 78 are different color densities in the above-mentioned embodiment, the first and second states are not limited to this. For example, the first and second states of the operation images 71 to 78 may be different colors. The first and second states of the operation images 71 to 78 may be continuous lighting up and blinking, or vice versa. The first and second states of the operation images 71 to 78 may be different luminances (brightnesses) or may be different shapes. Alternatively, the first and second states of the operation images 71 to 78 may be presence and absence of a specific character or may be display of different characters.

While the rightward arrows 'a' and the leftward arrows 'b' are respectively not displayed during the automatic start-up interruption processing and the automatic stop interruption processing in the above-mentioned embodiment, the rightward arrows 'a' and the leftward arrows 'b' may be respectively displayed during the automatic start-up interruption processing and the automatics stop interruption processing.

While preferred embodiments of the present invention have been described above, it is to be understood that variations and modifications will be apparent to those skilled in the art without departing the scope and spirit of the present invention. The scope of the present invention, therefore, is to be determined solely by the following claims.

We claim:

1. An analysis system comprising:
a sulfur chemiluminescence detector that includes a plurality of objects to be controlled;
a display; and
a display control device that controls the display, wherein the display control device includes:
a display controller that causes the display to display a plurality of status images corresponding to the plurality of objects in a row in a working order, and causes the display to display a plurality of operable operation images corresponding to the plurality of objects; and
an operation receiver that receives an operation for starting automatic start-up processing,
a start-up condition indicating a controlling order of the plurality of objects in the automatic start-up processing is determined in advance,
the display controller, when the operation receiver receives the operation for starting the automatic start-up processing, sequentially changes a display mode of a status image corresponding to an object that has worked to a first mode and changes a display state of each of the plurality of operation images to a first state indicating that a corresponding object is operable by an operation of the corresponding operation image or a second state indicating that the corresponding object is inoperable by the operation of the corresponding operation image so as to satisfy the start-up condition in the automatic start-up processing based on an instruction from the sulfur chemiluminescence detector, and
the display controller, when an operation image in the first state is operated, transmits an operation signal indicating that an operation has been performed on the operation image to the sulfur chemiluminescence detector, and the display controller, when an operation image in the second state is operated, does not transmit the operation signal to the sulfur chemiluminescence detector.

2. The analysis system according to claim 1, wherein the operation receiver is configured to receive an operation for interrupting the automatic start-up processing and an operation performed on each operation image, and is configured to receive an operation performed on an operation image in the first state of the plurality of operation images, and
the display controller, when the operation for interrupting the automatic start-up processing is received, keeps display modes of the plurality of status images and display states of the plurality of operation images, and then changes a display state of an operated operation image of the operation images in the first state and changes a display mode of a related status image based on an instruction from the sulfur chemiluminescence detector.

3. The analysis system according to claim 1, wherein the display controller erases the first direction image after the automatic start-up processing is completed, and erases the second direction image after the automatic stop processing is completed.

4. The analysis system according to claim 1, wherein the sulfur chemiluminescence detector includes a detection controller that transmits an instruction for displaying each of the plurality of status images in the first or second mode based on a state of a corresponding object, and transmits an instruction for changing a display state of each of the plurality of operation images to the first or second state based on states of the plurality of objects and a predetermined operation condition to the display controller.

5. The analysis system according to claim 1, wherein the display controller causes the display to display a first direction image indicating the working order of the plurality of objects when the operation receiver receives the operation for starting the automatic start-up processing.

6. The analysis system according to claim 1, wherein the operation receiver further receives an operation for automatic stop processing,
a stop condition indicating a controlling order of the plurality of objects in the automatic stop processing being determined in advance,
when the operation receiver receives the operation for starting the automatic stop processing, the display controller sequentially changes a display mode of a status image corresponding to an object that has stopped to a second mode and changes a display state of each of the plurality of operation images to the first or second state so as to satisfy the stop condition in the automatic stop processing based on an instruction from the sulfur chemiluminescence detector, and
the display controller transmits, when the operation image in the first state is operated, the operation signal indicating that the operation has been performed on the operation image to the sulfur chemiluminescence detector, and does not transmit, when the operation image in the second state is operated, the operation signal to the sulfur chemiluminescence detector.

7. The analysis system according to claim 6, wherein the operation receiver is configured to receive an operation for interrupting the automatic stop processing and an operation performed on each operation image, and is configured to receive an operation performed on an operation image in the first state of the plurality of operation images, and
the display controller, when the operation for interrupting the automatic stop processing is received, keeps display modes of the plurality of status images and display states of the plurality of operation images, and then changes a display state of an operated operation image of operation images in the first state and changes a display mode of a related status image based on an instruction from the sulfur chemiluminescence detector.

8. The analysis system according to claim 6, wherein when the operation receiver receives the operation for starting the automatic stop processing, the display controller causes the display to display a second direction image indicating a stopping order of the plurality of objects in a reversed manner of the first direction image.

9. A display control method of controlling a display for an operation of a sulfur chemiluminescence detector including a plurality of objects to be controlled, comprising:
causing the display to display a plurality of status images corresponding to the plurality of objects in a row in a working order, and causing the display to display a plurality of operable operation images corresponding to the plurality of objects;

receiving an operation for starting automatic start-up processing, a start-up condition indicating a controlling order of the plurality of objects in the automatic start-up processing being determined in advance;

when the operation for starting the automatic start-up processing is received, sequentially changing a display state of a status image corresponding to an object that has worked to a first mode and changing a display state of each of the plurality of operation images to a first state indicating that a corresponding object is operable by an operation of the corresponding operation image or a second state indicating that the corresponding object is inoperable by the operation of the corresponding operation image so as to satisfy the start-up condition in the automatic start-up processing based on an instruction from the sulfur chemiluminescence detector; and transmitting, when an operation image in the first state is operated, an operation signal indicating that an operation has been performed on the operation image to the sulfur chemiluminescence detector and not transmitting, when an operation image in the second state is operated, the operation signal to the sulfur chemiluminescence detector.

10. The display control method according to claim 9, further comprising causing the display to display a first direction image indicating the working order of the plurality of objects when the operation for starting the automatic start-up processing is received.

11. The display control method according to claim 9, further comprising:

receiving an operation for automatic stop processing, a stop condition indicating a controlling order of the plurality of objects in the automatic stop processing being determined in advance; and when an operation for starting the automatic stop processing is received, sequentially changing a display mode of a status image corresponding to an object that has stopped to a second mode and changing a display state of each of the plurality of operation images to the first or second state, and displaying each of the plurality of operation images in the first or second state so as to satisfy the stop condition in the automatic stop processing based on an instruction from the sulfur chemiluminescence detector; and transmitting, when the operation image in the first state is operated, an operation signal indicating that an operation has been performed on the operation image to the sulfur chemiluminescence detector, and not transmitting, when the operation image in the second state is operated, the operation signal to the sulfur chemiluminescence detector.

12. The display control method according to claim 11, further comprising causing the display to display a second direction image indicating a stopping order of the plurality of objects in a reversed manner of the first direction image when the operation for starting the automatic stop processing is received.

13. A non-transitory computer readable medium storing a display control program that controls a display to operate a sulfur chemiluminescence detector comprising a plurality of objects to be controlled, the display control program allowing the computer to execute:

a process of causing the display to display a plurality of status images corresponding to the plurality of objects in a row in a working order in the display, and causing the display to display a plurality of operable operation images corresponding to the plurality of objects;

a process of receiving an operation for starting automatic start-up processing, a start-up condition indicating a controlling order of the plurality of objects in the automatic start-up processing being determined in advance;

a process of, when the operation for starting automatic start-up processing is received, sequentially changing a display mode of a status image corresponding to an object that has worked to a first mode and displaying each of the plurality of operation images in a first state indicating that a corresponding object is operable by an operation of the corresponding operation image or a second state indicating that the corresponding object is inoperable by the operation of the corresponding operation image so as to satisfy the start-up condition in the automatic start-up processing based on an instruction from the sulfur chemiluminescence detector; and a process of transmitting, when an operation image in the first state is operated, an operation signal indicating that an operation has been performed on the operation image to the sulfur chemiluminescence detector, and not transmitting, when an operation image in the second state is operated, the operation signal to the sulfur chemiluminescence detector.

14. The non-transitory computer readable medium according to claim 13, wherein the display control program allows the computer to further execute a process of causing the display to display a first direction image indicating the working order of the plurality of objects when the operation for starting automatic start-up processing is received.

15. The non-transitory computer readable medium according to claim 13, wherein the display control program allows the computer to further execute:

a process of receiving automatic stop processing, a stop condition indicating a controlling order of the plurality of objects in the automatic stop processing being determined in advance;

a process of sequentially changing a display mode of a status image corresponding to an object that has stopped to a second mode and displaying each of the plurality of operation images in the first or second state so as to satisfy the stop condition in the automatic stop processing based on an instruction from the sulfur chemiluminescence detector when an operation for starting the automatic stop processing is received; and a process of transmitting, when the operation image in the first state is operated, an operation signal indicating that an operation has been performed on the operation image to the sulfur chemiluminescence detector, and not transmitting, when the operation image in the second state is operated, the operation signal to the sulfur chemiluminescence detector.

16. The non-transitory computer readable medium according to claim 15, wherein the display control program allows the computer to further execute a process of causing the display to display a second direction image indicating a stopping order of the plurality of objects in a reversed manner of the first direction image when the operation for starting the automatic stop processing is received.

\* \* \* \* \*